Nov. 8, 1927.

H. C. RANDALL ET AL 1,648,823

MACHINE FOR WASHING, GRADING, AND PEELING FRUITS, ETC

Filed Sept. 10, 1925   2 Sheets-Sheet 1

Inventor
Herbert C. Randall
and Clarence F. Colbert
By Alexander Farrell
Attorneys

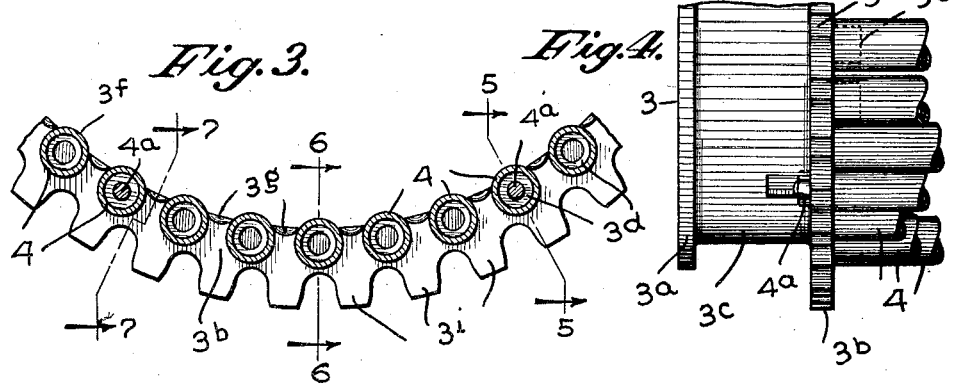
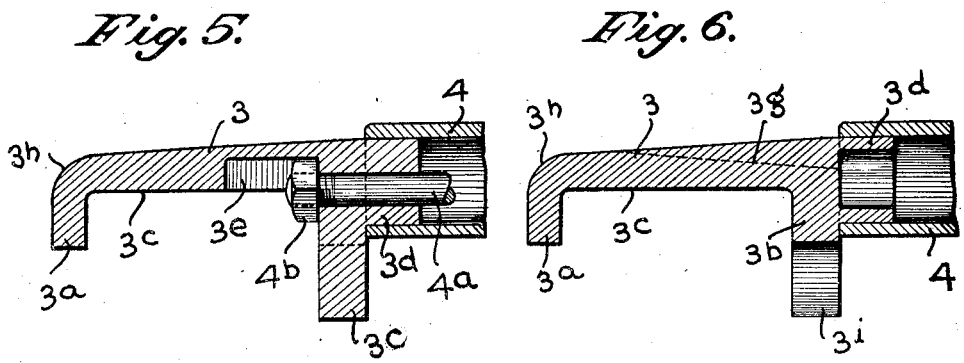
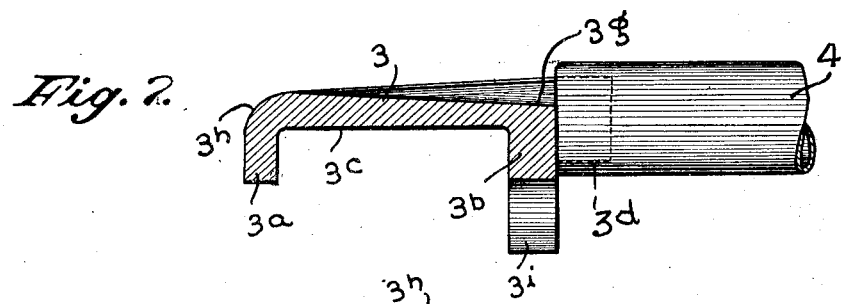
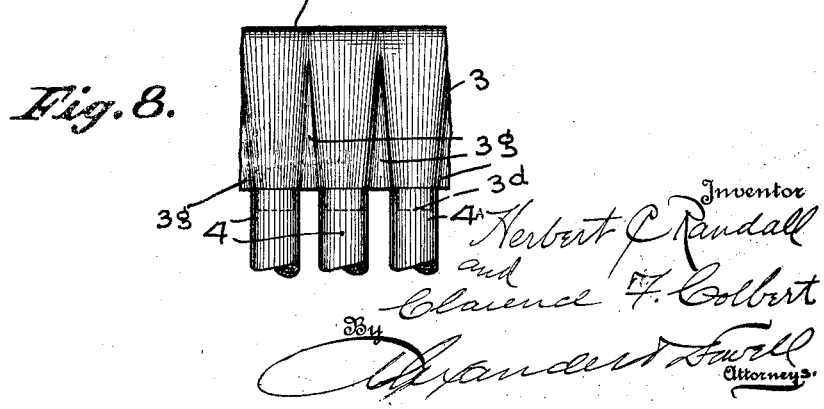

Patented Nov. 8, 1927.

1,648,823

UNITED STATES PATENT OFFICE.

HERBERT C. RANDALL AND CLARENCE F. COLBERT, OF BALTIMORE, MARYLAND, ASSIGNORS TO CANNING MACHINERY EXCHANGE, A FIRM CONSISTING OF H. C. RANDALL, PROPRIETOR, OF BALTIMORE, MARYLAND.

MACHINE FOR WASHING, GRADING, AND PEELING FRUITS, ETC.

Application filed September 10, 1925. Serial No. 55,480.

This invention is a novel improvement in machines such as are usually employed for washing, or separating or assorting fruits, vegetables, and the like, for peeling fruits by the acid process and the present invention has particular reference to the reel or cage used in such machines.

We will describe the invention with reference to the accompanying drawings which show one practical embodiment thereof as adapted for use in a vegetable or fruit washing or peeling machine, and summarize in the claims the essential features of the invention and the novel constructions and combinations of parts for which protection is desired.

In said drawings:

Figure 3 is an enlarged detail view of a portion of one of the annular end members of the reel or cage.

Figure 4 is a further enlarged side view partly broken away of one of the end members.

Figure 5 is an enlarged section on the line 5—5, Figure 3.

Figure 6 is an enlarged section on the line 6—6, Figure 3.

Figure 7 is an enlarged section on the line 7—7, Figure 3.

Figure 8 is a detail inside view of a portion of an end member with tubes attached.

Figure 1:
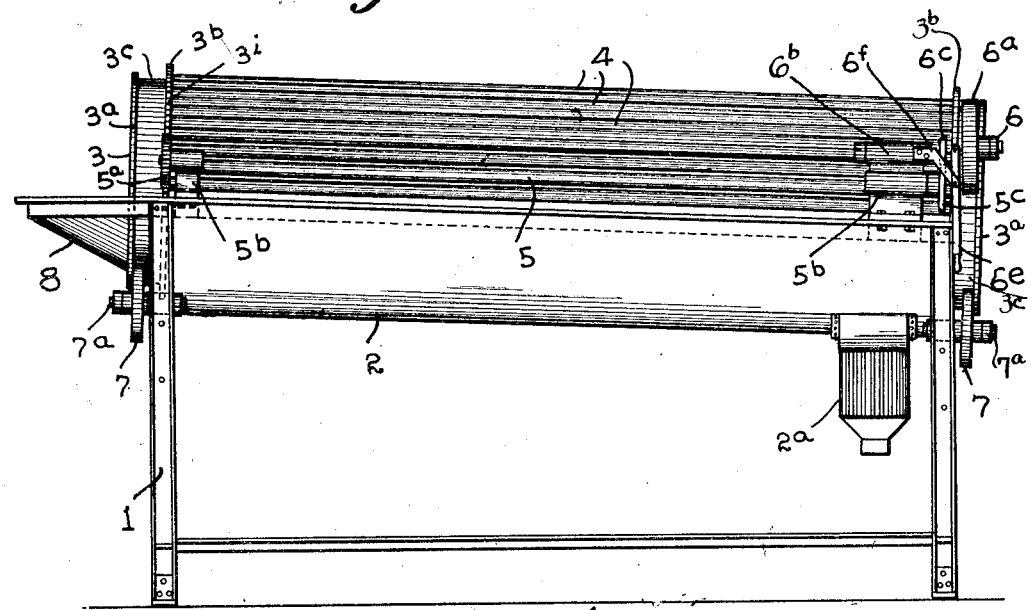
Figure 1 is a side elevation of a machine provided with our novel reel or cage.
Figure 2:
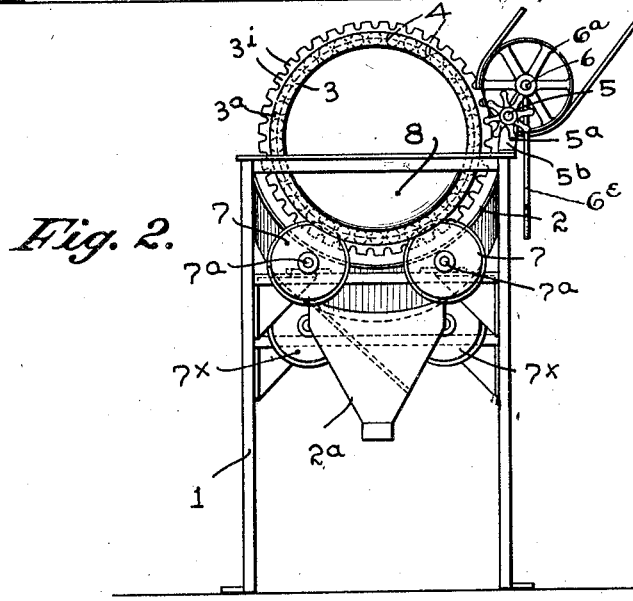
Figure 2 is an end view of said machine.

The machine comprises a main frame 1 of any suitable construction, having a tank or trough 2 adapted to contain or catch the wash water and provided with a drain outlet $2^a$ of any suitable construction, from which the water may be carried to a suitable point of discharge.

Mounted on the frame and extending longitudinally of the trough 2 is a cylindrical cage or reel which comprises annular end members 3, at opposite ends of the reel, and an annular series of intermediate round tube members 4 are preferably attached to said end members as hereinafter described. The annular end members 3 are constructed alike. Similar parts of the two end members are similarly lettered and a description of one will apply to both.

Each reel end member is provided with a flange $3^a$ on its outer end and a flange $3^b$ on its inner end, and with an annular bearing portion $3^c$ therebetween; by which the members are supported on rollers 7 mounted on suitable studs $7^a$ attached to the ends of members of the frame 1, so as to permit the reel to be readily rotated on its axis while retaining it properly positioned on the frame.

The reel end members are also provided with an annular series of spaced inwardly projecting bosses $3^d$ on their inner ends, adjacent the flange $3^b$, which bosses may project to or beyond the inner periphery of the end members, and these bosses enter the ends of the intermediate round members 4, see Figures 1, 5 and 6, and properly position and support the round members on the end members 3.

Preferably the end members and round intermediate members are bound together by means of tie rods $4^a$ (six being ordinarily employed), which can extend through the related intermediate members 4, the bosses $3^d$ and flanges $3^b$, and are secured by nuts $4^b$, on the outer end of the rods $4^a$ as indicated in Figures 4 and 5, and the end members may be provided with recesses $3^e$ at the outer sides of the flange $3^b$, see Figure 5, to accommodate the nuts. This construction provides a strong, stiff and durable reel or cage which can be very quickly assembled. The distance apart of the intermediate round members 4 is determined by the spacing apart of the bosses $3^d$.

The intermediate members 4 are preferably made tubular for lightness and economy of construction, but rods or other rounded members might be used in place of the tubes. Such round members, whether tubes or rods, present no cutting edges to the tomatoes or fruit being treated, and greatly enhance the utility of the machine.

The reel end members are provided on their inner peripheries with tapered or particonical recesses $3^g$, intermediate the bosses $3^d$, so that the fruit or vegetables can readily pass onto or off of the intermediate members 4 without injury and through the end members without injury by contact with the angular edges of the reel members. The end members are also preferably rounded as at $3^h$ adjacent the flange $3^a$ so that fruit or vegetables will readily pass thereover.

The reel may be rotated during the operation of the machine by any suitable means. As shown the end members 3 are provided with teeth $3^1$ on the periphery of the flanges $3^b$ and these teeth mesh with pinions $5^a$ on a shaft 5 journaled in brackets $5^b$ on the frame 1, said shaft 5 having a friction disk $5^c$ on its outer end engaging with a friction disk $6^c$ on the hub of a pulley $6^a$ mounted on a stud shaft 6 journaled in suitable brackets $6^b$ on the frame; the friction members $5^c$, $6^c$ can be engaged or disengaged by means of a shifting lever $6^e$ pivoted on an arm $6^f$, attached to the bracket $6^b$. The pulley $6^a$ may be belted to any suitable motor. Any other suitable means for driving the reel may be provided.

In the complete machine suitable means, not shown, is provided for applying jets or sprays or hot or cold water or acids to the vegetables or fruits traversing the reel; and suitable means, not shown, is also provided for feeding the fruit or vegetables into the reel or its receiving hopper 8, and for receiving the vegetables or fruit discharged from the reel. The feeding and delivery means, and the means for supplying water or steam or acids do not form part of the present invention and therefore need not be described or illustrated, as such devices will be readily supplied by any mechanic familiar with the art to suit the character of the work which the machine is to perform.

We claim:

1. A reel for the purpose specified, comprising annular end members provided with a series of inwardly projecting bosses and having tapered recesses in their inner faces intermediate the bosses; and round members interposed between said end members and supported by said bosses.

2. In a reel as set forth in claim 1, tie rods extending between and connecting the end members to bind the round members and end members together.

In testimony that we claim the foregoing as our own we affix our signatures.

HERBERT C. RANDALL.
CLARENCE F. COLBERT.